(12) United States Patent
Wang et al.

(10) Patent No.: US 10,802,374 B1
(45) Date of Patent: Oct. 13, 2020

(54) LIQUID CRYSTAL LENS

(71) Applicant: NATIONAL CHIAO TUNG UNIVERSITY, Hsinchu (TW)

(72) Inventors: Yu-Jen Wang, Taipei (TW); Yi-Hsin Lin, Zhubei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 16/666,525

(22) Filed: Oct. 29, 2019

(30) Foreign Application Priority Data

Aug. 27, 2019 (TW) .............................. 108130640 A

(51) Int. Cl.
*G02F 1/29* (2006.01)

(52) U.S. Cl.
CPC .......... *G02F 1/29* (2013.01); *G02F 2001/294* (2013.01); *G02F 2201/122* (2013.01); *G02F 2201/16* (2013.01)

(58) Field of Classification Search
CPC ...................................................... G02F 1/29
See application file for complete search history.

(56) References Cited

U.S. PATENT DOCUMENTS

| 8,194,228 | B2 | 6/2012 | Sato et al. | |
| 9,494,834 | B2 | 11/2016 | Lin et al. | |
| 2012/0262663 | A1* | 10/2012 | Chin | G02F 1/29 |
| | | | | 349/200 |
| 2019/0257993 | A1* | 8/2019 | Kim | G02B 5/32 |

FOREIGN PATENT DOCUMENTS

TW    I490557 B    7/2015

OTHER PUBLICATIONS

G. Li, et al., "Switchable electro-optic diffractive lens with high efficiency for ophthalmic applications," PNAS 103(16), 6100-6104 (2006).
Jamali, et al., "Design of a large aperture tunable refractive Fresnel liquid crystal lens," Applied Optics 57(7), 10-19 (2018).
H.S. Chen, et al., "A polarizer-free liquid crystal lens exploiting an embedded-multilayered structure," IEEE Photon. Technol. Lett. 27(8), 899-902 (2015).

* cited by examiner

*Primary Examiner* — Sang V Nguyen
(74) *Attorney, Agent, or Firm* — Michael Best & Friedrich LLP

(57) ABSTRACT

A liquid crystal lens includes at least two liquid crystal cells, and at least two electrode layer units. Each of the liquid crystal cells has a central portion, a first surrounding portion, and a second surrounding portion. Each of the electrode layer units is disposed to supply voltage to the respective liquid crystal cell to permit one of the liquid crystal cells to have a first radial gradient of refractive index in the central portion thereof, and to permit the other one of the liquid crystal cells to have a second radial gradient of refractive index in the first surrounding portion thereof, to thereby allow the two liquid crystal cells to cooperatively define an aperture of the liquid crystal lens.

9 Claims, 11 Drawing Sheets

LIQUID CRYSTAL LENS

CROSS-REFERENCE TO RELATED APPLICATION

This application claims priority from Taiwanese invention patent application no. 108130640, filed on Aug. 27, 2019.

FIELD

The disclosure relates to a liquid crystal lens, more particularly to an electrically tunable focusing lens with an enlarged aperture and with a spatially continuous distribution of optical phase.

BACKGROUND

U.S. Pat. No. 8,194,228 B2 discloses a conventional liquid crystal lens for which a focal distance can be greatly changed by an electrical control. The liquid crystal lens includes a first substrate having a first electrode, a second substrate, a second electrode arranged outside the second substrate, and a liquid crystal layer provided between the first and second substrates, and constituted by liquid crystal molecules oriented. A first voltage is applied between the first and second electrodes, thereby controlling the orientation of the liquid crystal molecules, whereby the liquid crystal lens operates. A third electrode is provided on an insulating layer and outside the second electrode. A second voltage independent of the first voltage is applied to the third electrode, thereby changing the optical properties. The conventional liquid crystal lens has a limited aperture.

U.S. Pat. No. 9,494,834 B2 discloses another conventional liquid crystal (LC) lens which includes a first substrate, a first electrode structure, an electrically tunable LC layer structure, a second substrate, and a second electrode structure. The electrically tunable LC layer structure is arranged between the first and second substrates, and includes at least two LC layers stacked upon one another. Each of the LC layers has at least one partition unit to partition the LC layer into one or more LC units. In this case, since the LC units are interrupted by the LC partition unit, the conventional LC lens may have a discontinuous optical phase which adversely affects the optical quality of the LC lens.

SUMMARY

Therefore, an object of the disclosure is to provide a novel liquid crystal lens which may have an enlarged aperture and which may have a spatially continuous distribution of optical phase.

According to the disclosure, a liquid crystal lens includes a first liquid crystal cell, a first electrode layer unit, a second liquid crystal cell, and a second electrode layer unit. The first liquid crystal cell includes a pair of first alignment layers which are spaced apart from each other along a normal line, and a plurality of first liquid crystal molecules which are filled between and aligned by the first alignment layers. The first electrode layer unit is disposed to generate a first predetermined varying electric field across the first liquid crystal cell so as to permit a first segment of the first liquid crystal cell to have a first gradient of refractive index. The second liquid crystal cell is disposed beneath the first liquid crystal cell, and includes a pair of second alignment layers which are spaced apart from each other along the normal line, and a plurality of second liquid crystal molecules which are filled between and aligned by the alignment layers. The second electrode layer unit is disposed to generate a second predetermined varying electric field across the second liquid crystal cell so as to permit a second segment of the second liquid crystal cell to have a second gradient of refractive index. The first and second segments are staggered in a direction of the normal line.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1A:
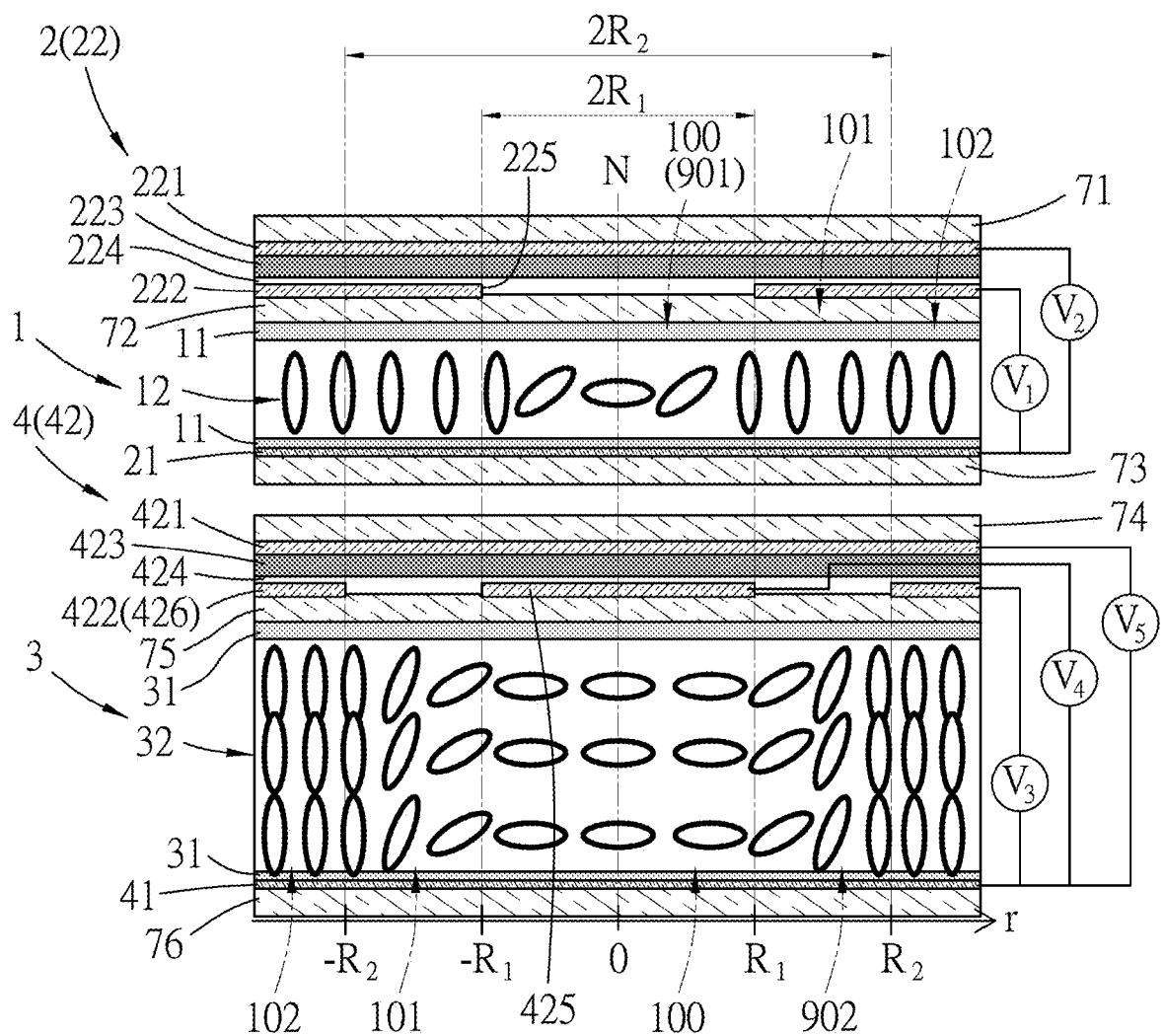
FIG. 1A is a schematic cross-sectional view of a liquid crystal lens according to a first embodiment of the disclosure.

Before the disclosure is described in greater detail, it should be noted that where considered appropriate, reference numerals have been repeated among the figures to indicate corresponding or analogous elements, which may optionally have similar characteristics.

It should be noted that the drawings, which are for illustrative purposes only, are not drawn to scale, and are not intended to represent the actual sizes or actual relative sizes of the components of the liquid crystal lens.

Referring to FIG. 1A, a liquid crystal lens according to a first embodiment of the disclosure is shown to include a first liquid crystal cell 1, a first electrode layer unit 2, a second liquid crystal cell 3, and a second electrode layer unit 4.

The first liquid crystal cell 1 includes a pair of first alignment layers 11 which are spaced apart from each other along a normal line (N), and a plurality of first liquid crystal molecules 12 which are filled between and aligned by the first alignment layers 11. The second liquid crystal cell 3 is disposed beneath the first liquid crystal cell 1, and includes a pair of second alignment layers 31 which are spaced apart from each other along the normal line (N), and a plurality of second liquid crystal molecules 32 which are filled between and aligned by the second alignment layers 31. The first and second liquid crystal molecules 12, 32 may be selected from the same or different liquid crystal molecules, and may be aligned respectively by the first and second alignment layers 11, 31 in the same or different orientation.

In an embodiment shown in FIG. 1A, each of the first and second liquid crystal cells 1, 3 has a central portion 100 which the normal line (N) passes through, a first surrounding portion 101 which surrounds the central portion 100, and a second surrounding portion 102 which surrounds the first surrounding portion 101. The central portion 100 and the first and second surrounding portions 101, 102 of the second liquid crystal cell 3 are respectively in alignment with those of the first liquid crystal cell 1 in a direction of the normal line (N).

In an embodiment shown in FIG. 1A, the central portion 100 of each of the first and second liquid crystal cells 1, 3 defines a first radius ($R_1$) about the normal line (N), and the central portion 100 and the first surrounding portion 101 of each of the first and second liquid crystal cells 1, 3 cooperatively define a second radius ($R_2$) about the normal line (N). A thickness of the second liquid crystal cell 3 is three times a thickness of the first liquid crystal cell 1, and the second radius ($R_2$) is two times the first radius ($R_1$).

The first electrode layer unit 2 is disposed to generate a first predetermined varying electric field across the first liquid crystal cell 1 so as to permit a first segment 901 of the first liquid crystal cell 1 to have a first gradient of refractive index. The second electrode layer unit 4 is disposed to generate a second predetermined varying electric field across the second liquid crystal cell 3 so as to permit a second segment 902 of the second liquid crystal cell 3 to have a second gradient of refractive index. The first and second segments 901, 902 are staggered in the direction of the normal line (N). In this embodiment, the first and second predetermined varying electric fields are each independently a predetermined radially varying electric field. In other embodiment, each of the first and second predetermined varying electric fields may be varied in any desired directions (a radial direction, radial directions, a tangential direction, etc.) based on the design of the liquid crystal lens.

In an embodiment shown in FIG. 1A, the first electrode layer unit 2 is configured such that when the first predetermined varying electric field is generated across the first liquid crystal cell 1, the central portion 100 of the first liquid crystal cell 1, serving as the first segment 901, is permitted to have the first gradient of refractive index (i.e., a first radial gradient of refractive index). The second electrode layer unit 4 is configured such that when the second predetermined varying electric field is generated across the second liquid crystal cell 3, the first surrounding portion 101 of the second liquid crystal cell 3, serving as the second segment 902, is permitted to have the second gradient of refractive index (i.e., a second radial gradient of refractive index). As such, the central portion 100 of the first liquid crystal cell 1 and the first surrounding portion 101 of the second liquid crystal cell 3 are permitted to cooperatively define an aperture of the liquid crystal lens. To wit, by combining the second liquid crystal cell 3 to the first liquid crystal cell 1 with an aperture (i.e., $2R_1$), the liquid crystal lens may have an enlarged aperture (i.e., $2R_2$).

Figure 1B:
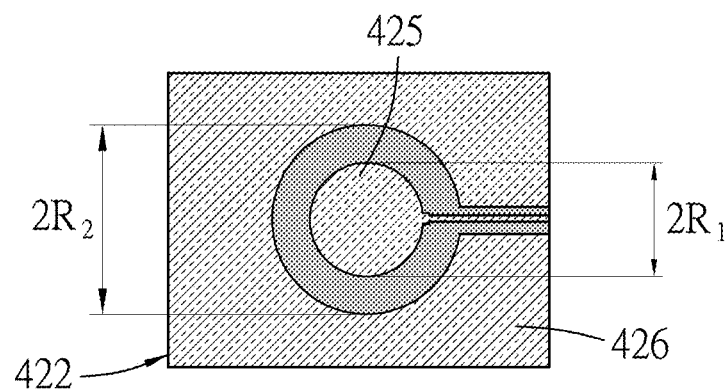
FIG. 1B is a plan view of a second proximate electrode in the liquid crystal lens of the first embodiment.
Figure 1C:
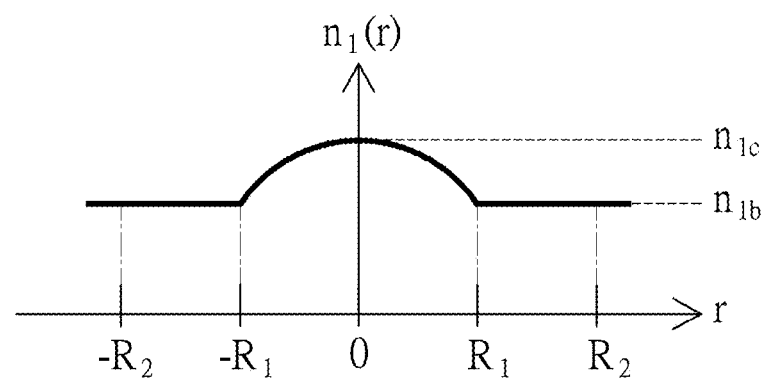
FIG. 1C is graphical view showing a refractive index distribution of a first liquid crystal cell in the liquid crystal lens of the first embodiment.

As shown in FIGS. 1A and 1C, a coordinate (r) represents a position along a length of the liquid crystal lens, a refractive index of the first liquid crystal cell 1 at the normal line (N) (where r is 0) is referred to as "$n_{1c}$," and the first and second surrounding portions 101, 102 of the first liquid crystal cell 1 (where $r<-R_1$ and $r>R_1$) have the same refractive index which is referred to as "$n_{1b}$." The central portion 100 of the first liquid crystal cell 1 (where $-R_1 \leq r \leq R_1$) have the first gradient of refractive index, which varies from $n_1$, at the center of the central portion 100 to $n_{1b}$ at the periphery of the central portion 100. The refractive index ($n_1$) of the first liquid crystal cell 1 shown in FIG. 1C is continuously distributed, and thus the first liquid crystal cell 1 has a spatially continuous distribution of optical phase.

Figure 1D:
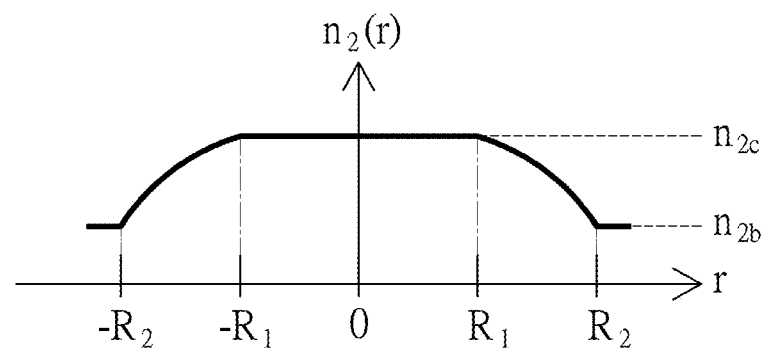
FIG. 1D is graphical view showing a refractive index distribution of a second liquid crystal cell in the liquid crystal lens of the first embodiment.

As shown in FIGS. 1A and 1D, the central portion 100 of the second liquid crystal lens 3 (where $-R_1 \leq r \leq R_1$) has a homogeneous refractive index which is referred to as "$n_{2c}$," and the second surrounding portion 102 of the second liquid crystal cell 3 (where $r<-R_2$ and $r>R_2$) has a homogeneous refractive index which is referred to as "$n_{2b}$." The first surrounding portion 101 of the second liquid crystal cell 3 (where $-R_2 \leq r <-R_1$ and $R_1 < r \leq R_2$) have the second gradient of refractive index, which ranges from $n_{2b}$ to $n_{2c}$. The refractive index ($n_2$) of the second liquid crystal cell 3 shown in FIG. 1D is continuously distributed, and thus the second liquid crystal cell 3 has a spatially continuous distribution of optical phase. Please note that because both the first and second liquid crystal cells 1, 3 have the spatially continuous distribution of optical phase, the liquid crystal lens of the disclosure can provide a spatially continuous distribution of optical phase.

In an embodiment shown in FIG. 1A, the first electrode layer unit 2 may include a first non-patterned electrode layer 21 and a first patterned electrode layer 22 which are separated from each other along the normal line (N), and which are disposed at two opposite sides of the first liquid crystal cell 1, respectively, so as to generate the first predetermined varying electric field across the first liquid crystal cell 1. The first non-patterned electrode layer 21 may be disposed to cover the central portion 100, and the first and second surrounding portions 101, 102 of the first liquid crystal cell 1, from the bottom sides thereof.

In an embodiment shown in FIG. 1A, the first patterned electrode layer 22 may include a first distal electrode film 221 and a first proximate electrode film 222 which are disposed distal from and proximate to the first liquid crystal cell 1, respectively, and which are separated from each other by a first insulating layer 223 and a first resistance layer 224. The first insulating layer 223 and the first resistance layer 224 are respectively in contact with the first distal and proximate electrode films 221, 222. The first distal electrode film 221 may be disposed to cover the central portion 100, and the first and second surrounding portions 101, 102 of the first liquid crystal cell 1. The first proximate electrode film 222 has a cutout region 225 corresponding in position to the central portion 100 of the first liquid crystal cell 1 so as to orient the first liquid crystal molecules 12 to permit the central portion 100 of the first liquid crystal cell 1 to have the first gradient of refractive index when the first predetermined varying electric field is generated across the first liquid crystal cell 1. The first proximate electrode film 222 may be disposed to cover the first and second surrounding portions 101, 102 of the first liquid crystal cell 1.

In addition, a first voltage ($V_1$) between the first proximate electrode film 222 and the first non-patterned electrode layer 21, and a second voltage ($V_2$) between the first distal electrode film 221 and the first non-patterned electrode layer 21 may be varied for varying the first gradient of refractive index and the values of the refractive indexes ($n_{1b}$, $n_{1c}$).

In an embodiment shown in FIG. 1A, the second electrode layer unit 4 may include a second non-patterned electrode layer 41 and a second patterned electrode layer 42 which are separated from each other along the normal line (N), and which are disposed at two opposite sides of the second liquid crystal cell 3, respectively, so as to generate the second predetermined varying electric field across the second liquid crystal cell 3. The second non-patterned electrode layer 41 may be disposed to cover the central portion 100, and the first and second surrounding portions 101, 102 of the second liquid crystal cell 3, from the bottom sides thereof.

In an embodiment shown in FIGS. 1A and 1B, the second patterned electrode layer 42 may include a second distal electrode film 421 and a second proximate electrode film 422 which are disposed distal from and proximate to the second liquid crystal cell 3, respectively, and which are separated from each other by a second insulating layer 423 and a second resistance layer 424. The second insulating layer 423 and the second resistance layer 424 are respectively in contact with the second distal and proximate electrode films 421, 422. The second distal electrode film 421 may be disposed to cover the central portion 100, and the first and second surrounding portions 101, 102 of the second liquid crystal cell 3. The second proximate electrode film 422 has a central electrode region 425 and a surrounding electrode region 426 which respectively correspond in position to the central portion 100 and the second surrounding portion 102 of the second liquid crystal cell 3 and which are radially separated from each other so as to orient the second liquid crystal molecules 32 to permit the first surrounding portion 101 of the second liquid crystal cell 3 to have the second gradient of refractive index when the second predetermined varying electric field is generated across the second liquid crystal cell 3. The central electrode region 425 and the surrounding electrode region 426 may be disposed to cover the central portion 100 and the second surrounding portion 102 of the second liquid crystal cell 3, respectively.

In addition, a third voltage ($V_3$) between the surrounding electrode region 426 and the second non-patterned electrode layer 41, a fourth voltage ($V_4$) between the central electrode region 425 and the second non-patterned electrode layer 41, and a fifth voltage ($V_5$) between the second distal electrode film 421 and the second non-patterned electrode layer 41 may be varied for varying the second gradient of refractive index and the values of the refractive indexes ($n_{2b}$ and $n_{2c}$). By varying the first, second, third, fourth, and fifth voltages ($V_1$ to $V_5$), a focal length of the liquid crystal lens can be varied continuously.

In an embodiment shown in FIG. 1A, the first patterned electrode layer 22, together with the first insulating layer 223 and the first resistance layer 224, is sandwiched between two substrates 71, 72. The first liquid crystal cell 1 and the first non-patterned electrode layer 21 are sandwiched between the substrate 72 and a substrate 73. The second patterned electrode layer 42, together with the second insulating layer 423 and the second resistance layer 424, is sandwiched between two substrates 74, 75. The second liquid crystal cell 3 and the second non-patterned electrode layer 41 are sandwiched between the substrate 75 and a substrate 76. Each of the substrates 71-76 is a light-transmissive substrate, such as a glass substrate or the like. The substrates 73, 74 may be joined to each other by a suitable adhesive.

In a non-shown embodiment, the first and second segments 901, 902 may be staggered and may partially overlap in the direction of the normal line (N).

In one embodiment, the first and second liquid crystal cells 1, 3 may each have positive or negative optical power, and may have different focal length. The liquid crystal lens may be applied to an electrically turnable focusing lens, a multifocal lens, a bifocal lens, freeform optics, a polarization independent lens, etc.

Figure 2:
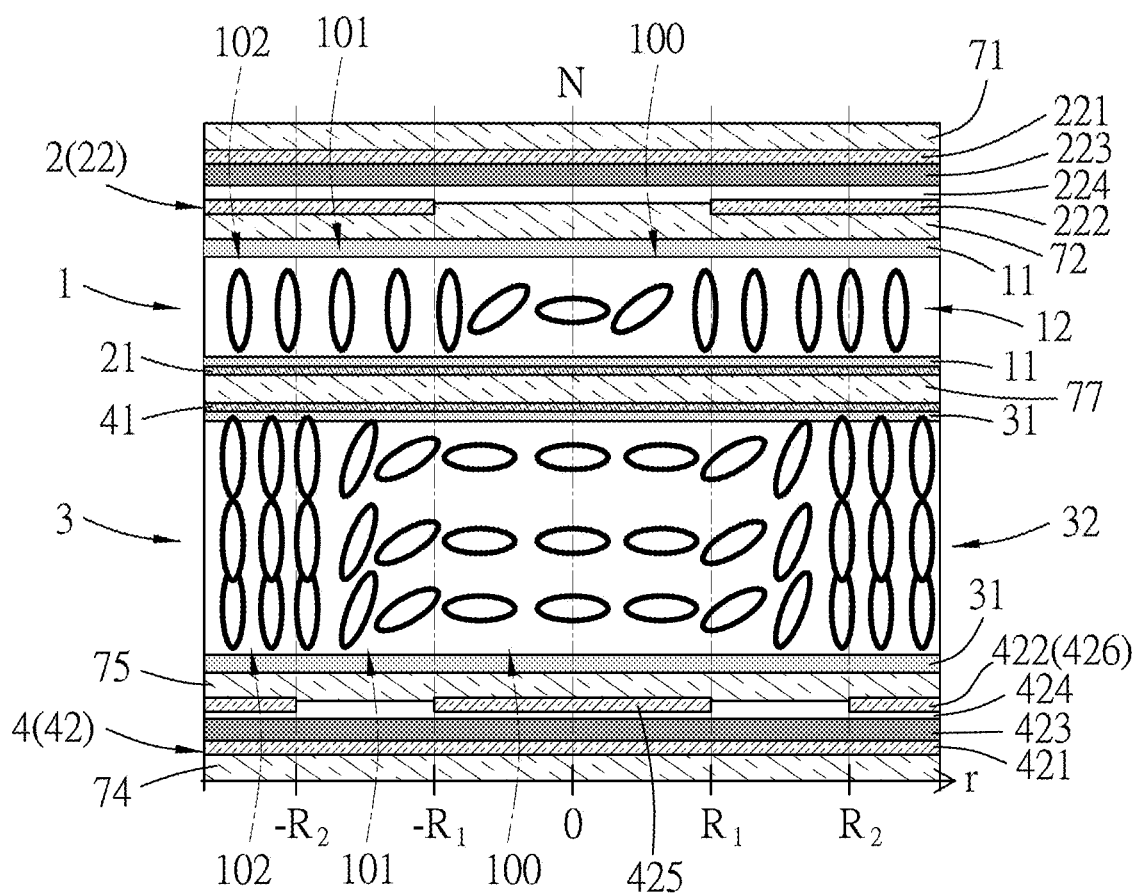
FIG. 2 is a schematic cross-sectional view of a liquid crystal lens according to a second embodiment of the disclosure.

FIG. 2 illustrates a liquid crystal lens according to a second embodiment of the disclosure. The second embodiment is similar to the first embodiment, except that in the second embodiment, the second liquid crystal cell 3 is inversely positioned, and the first and second liquid crystal cells 1, 3 share the same substrate 77. Therefore, the substrates 73, 76 shown in the first embodiment are omitted in this embodiment. The substrate 77 is a light-transmissive substrate, such as a glass substrate or the like.

Figure 3:
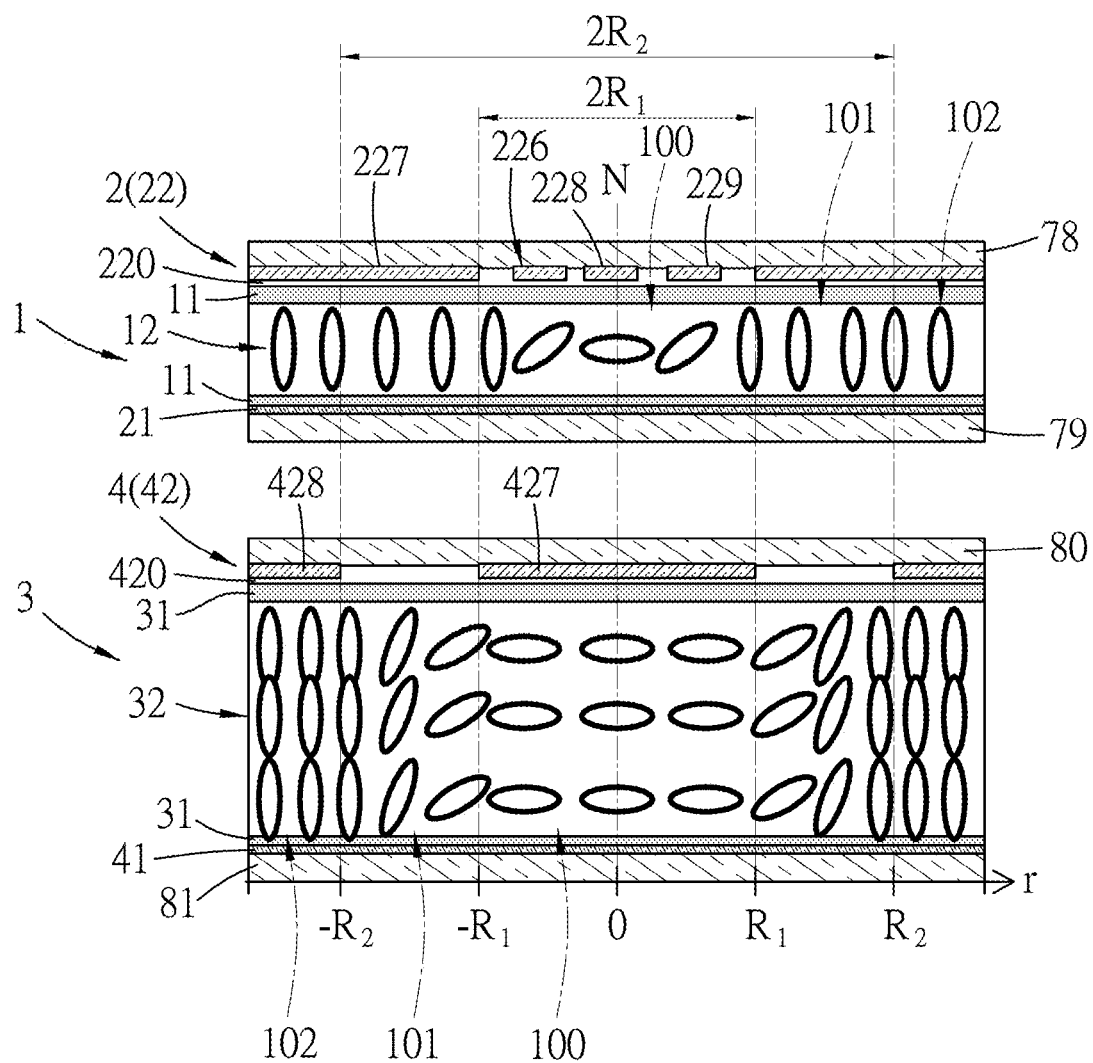
FIG. 3 is a schematic cross-sectional view of a liquid crystal lens according to a third embodiment of the disclosure.

FIG. 3 illustrates a liquid crystal lens according to a third embodiment of the disclosure. The third embodiment is similar to the first embodiment, except that in the third embodiment, the first patterned electrode layer 22 is separated from a corresponding one of the first alignment layers 11 by a first resistance layer 220, and the second patterned electrode layer 42 is separated from a corresponding one of the second alignment layers 31 by a second resistance layer 420.

The first patterned electrode layer 22 has a patterned region 226 and a non-patterned region 227 surrounding the patterned region 226. The patterned region 226 corresponds in position to the central portion 100 of the first liquid crystal cell 1 so as to orient the first liquid crystal molecules 12 to permit the central portion 100 of the first liquid crystal cell 1 to have the first gradient of refractive index when the first predetermined varying electric field is generated across the first liquid crystal cell 1. The non-patterned region 227 may be disposed to cover the first and second surrounding portions 101, 102 of the first liquid crystal cell 1, and the patterned region 226 may be disposed above the central portion 100 of the first liquid crystal cell 1.

In an embodiment shown in FIG. 3, the patterned region 226 includes a central electrode area 228 which the normal line (N) passes through, and a ring electrode area 229 which surrounds the central electrode area 228 and which is radially spaced apart from the central electrode area 228. A voltage between the central electrode area 228 and the first non-patterned electrode layer 21, a voltage between the ring electrode area 229 and the first non-patterned electrode layer 21, and a voltage between the non-patterned region 227 and the first non-patterned electrode layer 21 may be varied for varying the first gradient of refractive index and the values of the refractive indexes (i.e., $n_{1b}$ and $n_{1c}$ shown in FIG. 1C).

The second patterned electrode layer 42 has a central electrode region 427 and a surrounding electrode region 428 which respectively correspond in position to the central portion 100 and the second surrounding portion 102 of the second liquid crystal cell 3 and which are radially separated from each other so as to orient the second liquid crystal molecules 32 to permit the first surrounding portion 101 of the second liquid crystal cell 3 to have the second gradient of refractive index when the second predetermined varying electric field is generated across the second liquid crystal cell 3. The central electrode region 427 and the surrounding electrode region 428 may be disposed to cover the central portion 100 and the second surrounding portion 102 of the second liquid crystal cell 3, respectively.

Furthermore, a voltage between the central electrode region 427 and the second non-patterned electrode layer 41, and a voltage between the surrounding electrode region 428 and the second non-patterned electrode layer 41 may be varied for varying the second gradient of refractive index and the values of the refractive indexes (i.e., $n_{2b}$ and $n_{2c}$ shown in FIG. 1D).

In an embodiment shown in FIG. 3, the first liquid crystal cell 1 and the first electrode layer unit 2 are sandwiched between two substrates 78, 79, and the second liquid crystal cell 3 and the second electrode layer unit 4 are sandwiched between two substrates 80, 81. Each of the substrates 78-81 is a light-transmissive substrate, such as a glass substrate or the like. The substrates 79, 80 may be joined to each other by a suitable adhesive.

Figure 4:
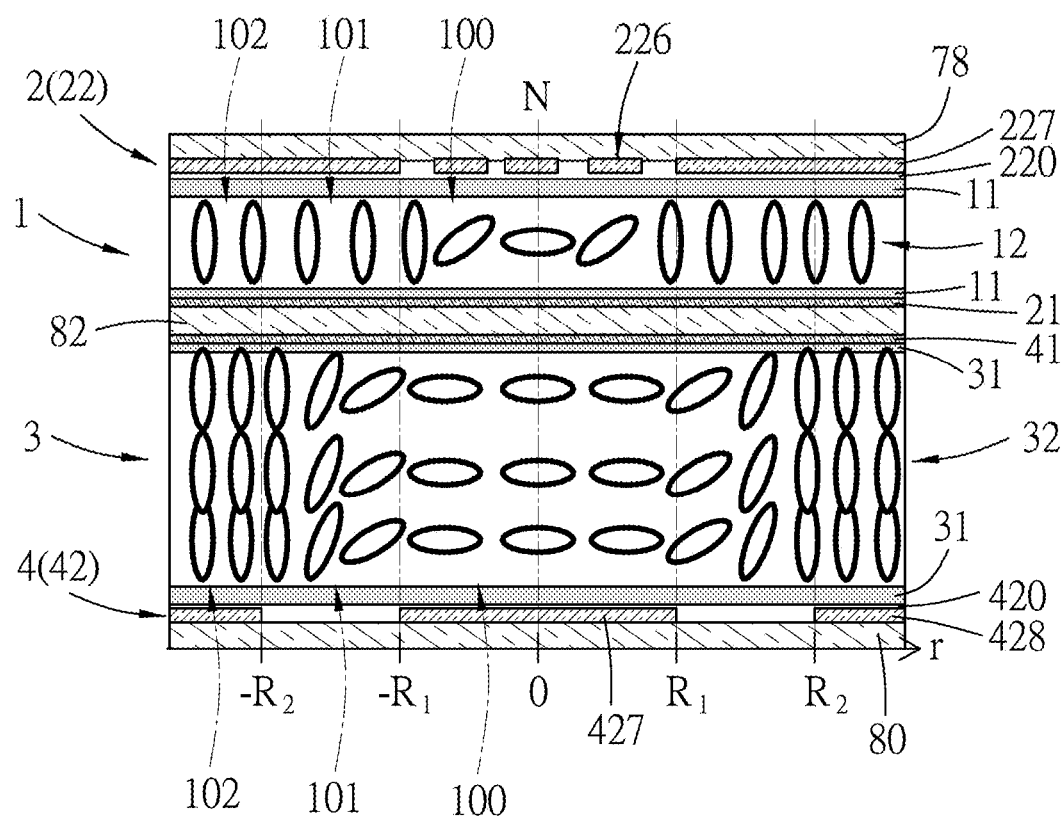
FIG. 4 is a schematic cross-sectional view of a liquid crystal lens according to a fourth embodiment of the disclosure.

FIG. 4 illustrates a liquid crystal lens according to a fourth embodiment of the disclosure. The fourth embodiment is similar to the third embodiment, except that in the fourth embodiment, the second liquid crystal cell 3 is inversely positioned, and the first and second liquid crystal cells 1, 3 share the same substrate 82. Therefore, the substrates 79, 81 shown in the third embodiment are omitted in this embodiment. The substrate 82 is a light-transmissive substrate, such as a glass substrate or the like.

Figure 5:
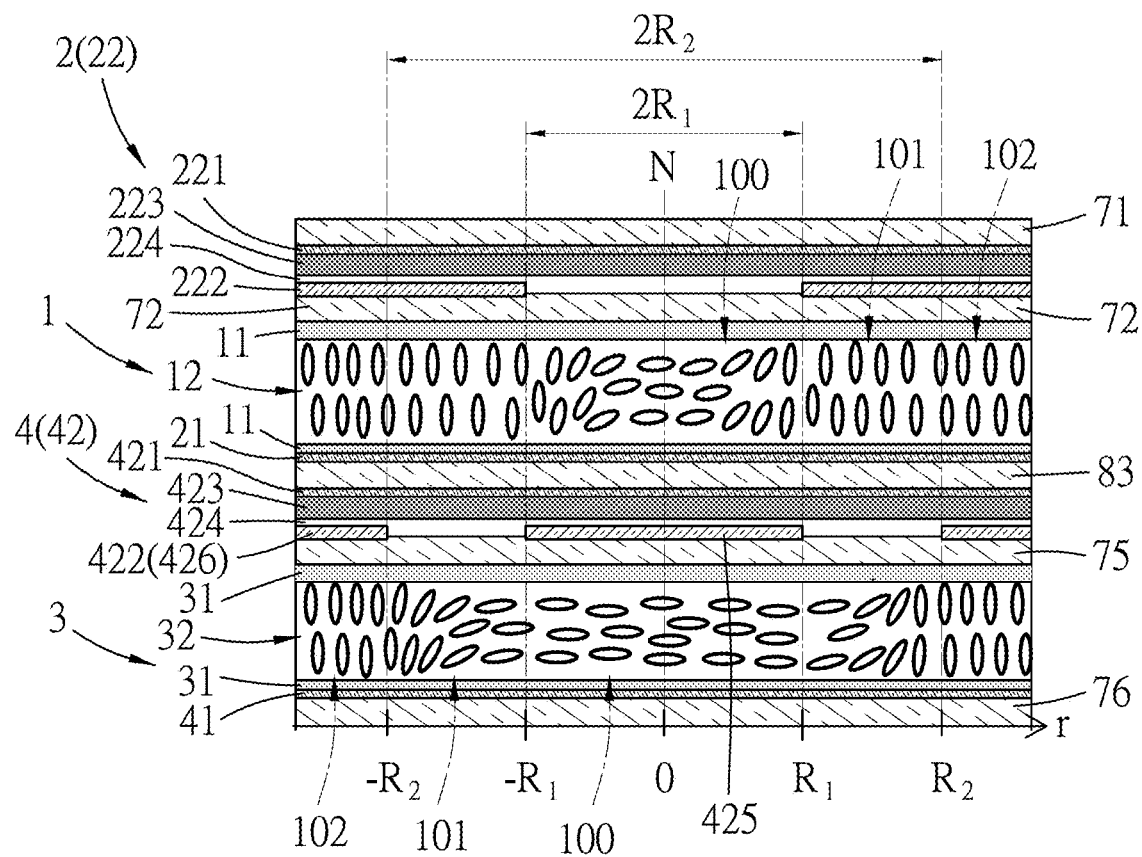
FIG. 5 is a schematic cross-sectional view of a liquid crystal lens according to a fifth embodiment of the disclosure.

FIG. 5 illustrates a liquid crystal lens according to a fifth embodiment of the disclosure. The fifth embodiment is similar to the first embodiment, except that in the fifth embodiment, the first and second liquid crystal cells 1, 3 share the same substrate 83. Therefore, the substrates 73, 74 shown in the first embodiment are omitted in this embodiment. The substrate 83 is a light-transmissive substrate, such as a glass substrate or the like.

In addition, the first and second liquid crystal cells 1, 3 have the same thickness. In this case, the first and second liquid crystal cells 1, 3 may have a phase difference represented by the following equation:

$$\text{phase difference} = \frac{k}{2 \times f_0} \times (R_2^2 - R_1^2)$$

where k is wavenumber, $f_0$ is a focal length of the liquid crystal lens, and $R_1$ and $R_2$ are as defined above.

In order to permit the first and second liquid crystal cells 1, 3 to have the same optical phases, the second radius ($R_2$) is equal to the first radius ($R_1$) multiplied by the square root of two (i.e., $R_2 = \sqrt{2} \times R_1$).

Figure 6A:
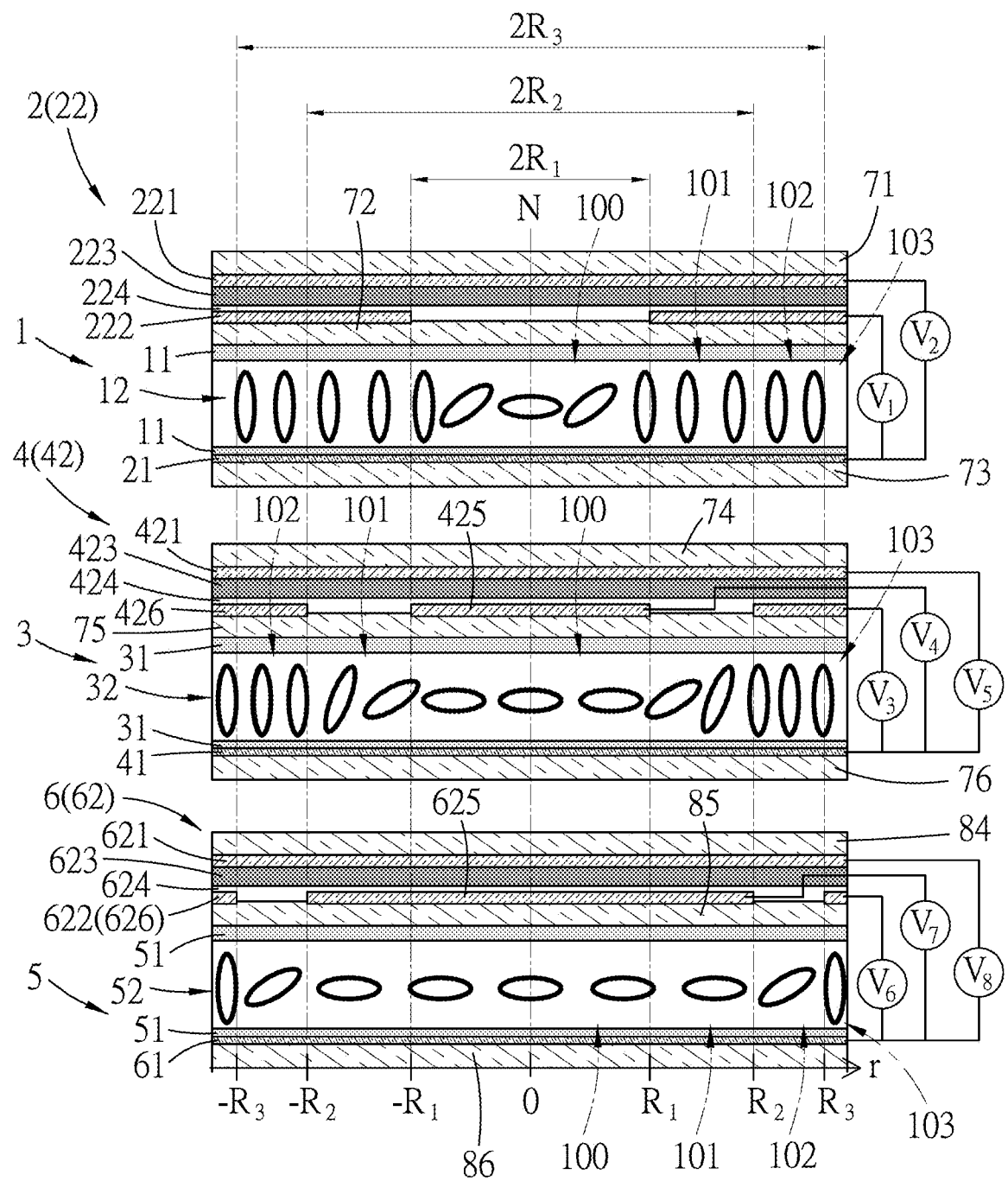
FIG. 6A is a schematic cross-sectional view of a liquid crystal lens according to a six embodiment of the disclosure.

FIG. 6A illustrates a liquid crystal lens according to a sixth embodiment of the disclosure. The sixth embodiment is similar to the first embodiment, except that in the sixth embodiment, each of the first and second liquid crystal cells 1, 3 further has a third surrounding portion 103 which surrounds the second surrounding portion 102. Each of the first and second non-patterned electrode layers 21, 41 may be disposed to cover the central portion 100, and the first, second, and third surrounding portions 101, 102, 103 of a respective one of the first and second liquid crystal cells 1, 3, from the bottom sides thereof. Each of the first and second distal electrode films 221, 421 may be disposed to cover the central portion 100, and the first, second, and third surrounding portions 101, 102, 103 of a respective one of the first and second liquid crystal cells 1, 3. The first proximate electrode film 222 may be disposed to cover the first, second, and third surrounding portions 101, 102, 103 of the first liquid crystal cell 1. The surrounding electrode region 426 may be disposed to cover the second and third surrounding portions 102, 103 of the second liquid crystal cell 3. In each of the first and second liquid crystal cells 1, 3, the central portion 100 and the first and second surrounding portions 101, 102 cooperatively define a third radius ($R_3$) about the normal line (N).

Figure 6B:
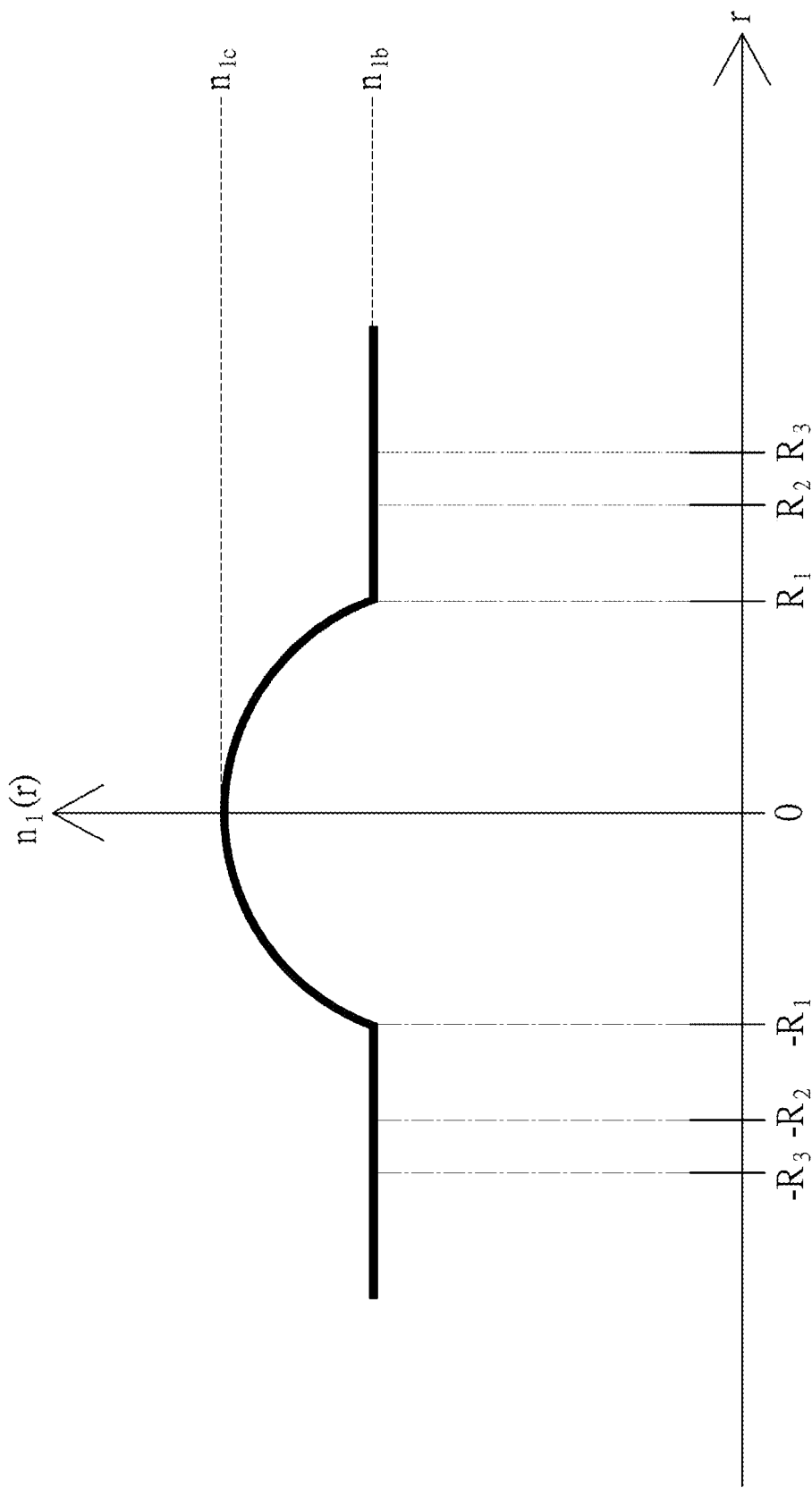
FIG. 6B is graphical view showing a refractive index distribution of a first liquid crystal cell in the liquid crystal lens of the six embodiment.

As shown in FIGS. 6A and 6B, a coordinate (r) represents a position along a length of the liquid crystal lens, a refractive index of the first liquid crystal cell 1 at the normal line (N) (where r is 0) is referred to as "$n_{1c}$," and the first, second, and third surrounding portions 101, 102, 103 of the first liquid crystal cell 1 (where $r < -R_1$ and $r > R_1$) have the same refractive index which is referred to as "$n_{1b}$." The central portion 100 of the first liquid crystal cell 1 (where $-R_1 \leq r \leq R_1$) have the first gradient of refractive index, which varies from $n_{1c}$ at the center of the central portion 100 to $n_{1b}$ at the periphery of the central portion 100. The refractive index ($n_1$) of the first liquid crystal cell 1 shown in FIG. 6B is continuously distributed, and thus the first liquid crystal cell 1 has a spatially continuous distribution of optical phase.

Figure 6C:
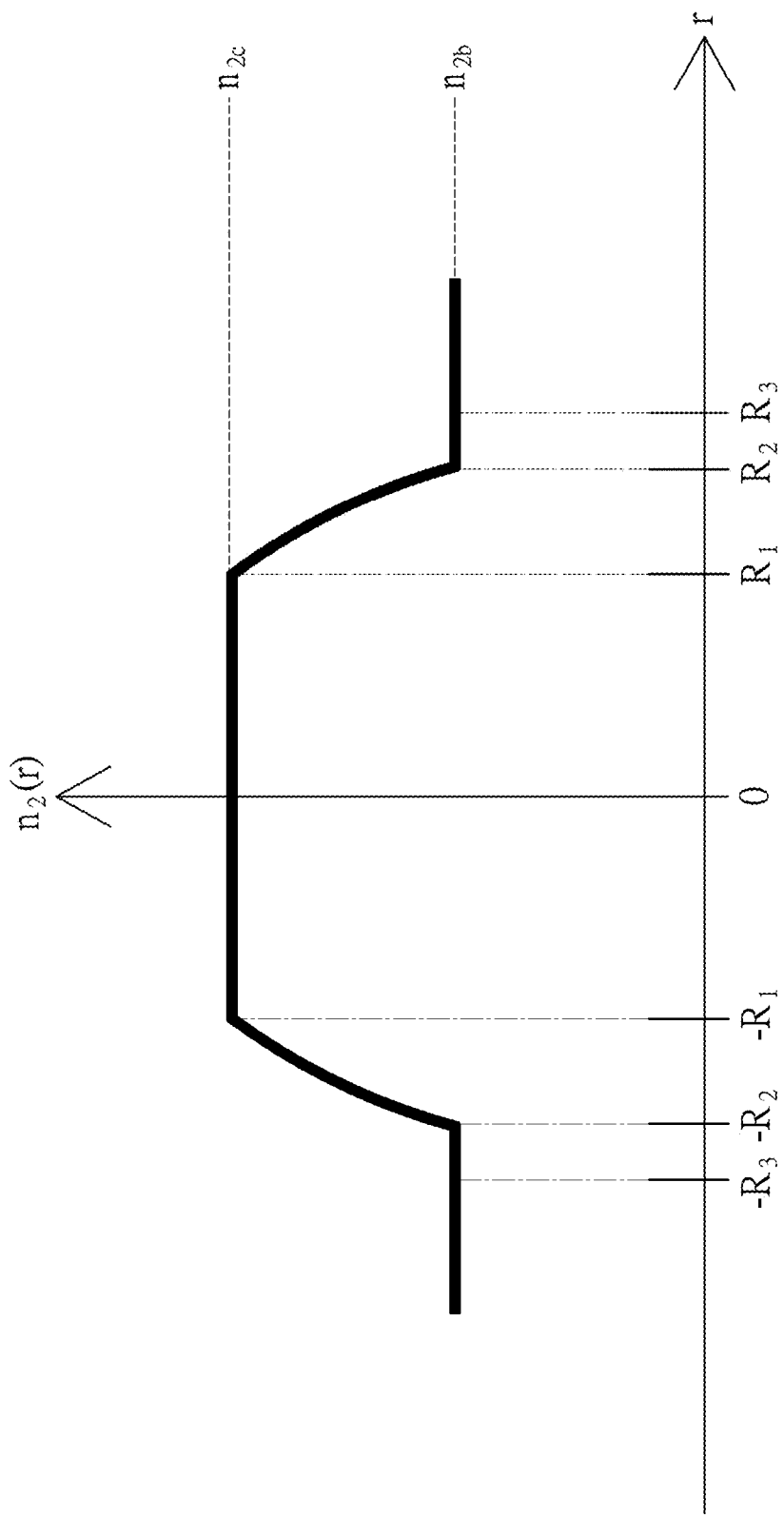
FIG. 6C is graphical view showing a refractive index distribution of a second liquid crystal cell in the liquid crystal lens of the six embodiment.

As shown in FIGS. 6A and 6C, the central portion 100 of the second liquid crystal lens 3 (where $-R_1 \leq r \leq R_1$) have a homogenous refractive index which is referred to as "$n_{2c}$," and the second and third surrounding portions 102, 103 of the second liquid crystal cell 3 (where $r < -R_2$ and $r > R_2$) have the same refractive index which is referred to as "$n_{2b}$." The first surrounding portion 101 of the second liquid crystal cell 3 (where $-R_2 \leq r < -R_1$ and $R_1 < r \leq R_2$) have the second gradient of refractive index, which ranges from $n_{2b}$ to $n_{2c}$. The refractive index ($n_2$) of the second liquid crystal cell 3 shown in FIG. 6C is continuously distributed, and thus the second liquid crystal cell 3 has a spatially continuous distribution of optical phase.

Furthermore, the liquid crystal lens further includes a third liquid crystal cell 5 and a third electrode layer unit 6.

The third liquid crystal cell 5 has a central portion 100, a first surrounding portion 101 which surrounds the central portion 100, a second surrounding portion 102 which surrounds the first surrounding portion 101, and a third surrounding portion 103 which surrounds the second surrounding portion 102. The third liquid crystal cell 5 is disposed beneath the second liquid crystal cell 3 to permit the central portion 100, and the first, second, and third surrounding portions 101, 102, 103 of the third liquid crystal cell 5 to be respectively in alignment with those of the second liquid crystal cell 3 in the direction of the normal line (N). The third liquid crystal cell 5 includes a pair of third alignment layers 51 which are spaced apart from each other along the normal line (N), and a plurality of third liquid crystal molecules 52 which are filled between and aligned by the third alignment layers 51.

The third electrode layer unit 6 is disposed to generate a third predetermined radially varying electric field across the third liquid crystal cell 5 so as to orient the third liquid crystal molecules 52 to permit the second surrounding portion 102 of the third liquid crystal cell 3 to have a third gradient of refractive index, to thereby allow the central portion 100 of the first liquid crystal cell 1, the first surrounding portion 101 of the second liquid crystal cell 3, and the second surrounding portion 102 of the third liquid crystal cell 5 to cooperatively define the aperture of the liquid crystal lens. Therefore, it can be noted that the aperture of the liquid crystal lens may be further enlarged by further combining one or more liquid crystal cells.

Figure 6D:
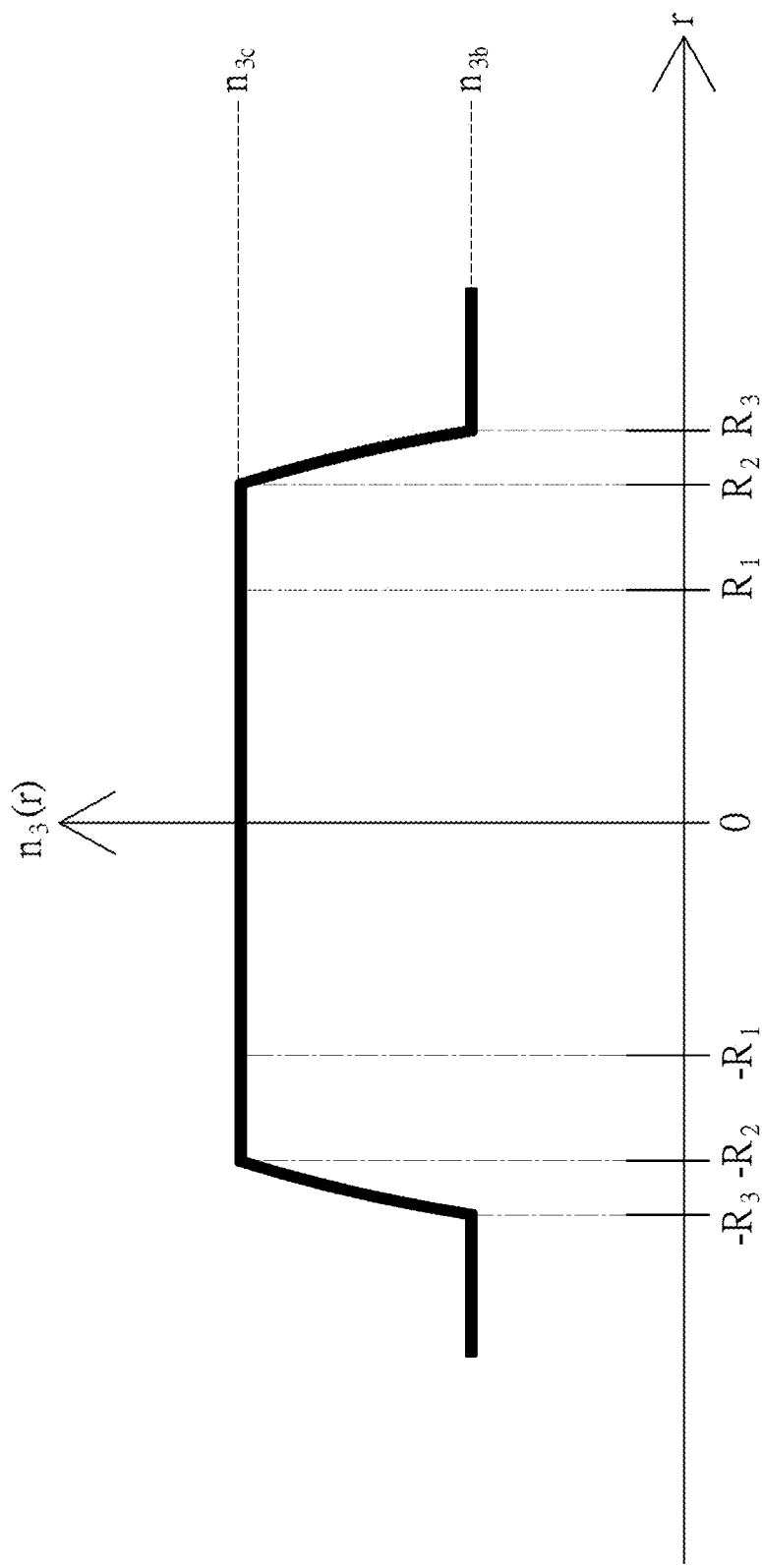
FIG. 6D is graphical view showing a refractive index distribution of a third liquid crystal cell in the liquid crystal lens of the six embodiment.

As shown in FIGS. 6A and 6D, the central portion 100 and the first surrounding portion 101 of the third liquid crystal lens 5 (where $-R_2 \leq r \leq R_2$) have the same refractive index which is referred to as "$n_{3c}$," and the third surrounding portion 103 of the third liquid crystal cell 5 (where $r<-R_3$ and $r>R_3$) has a homogenous refractive index which is referred to as "$n_{3b}$." The second surrounding portion 102 of the third liquid crystal cell 5 (where $-R_3 \leq r <-R_2$ and $R_2<r \leq R_3$) have the third gradient of refractive index, which ranges from $n_{3b}$ to $n_{3c}$. The refractive index ($n_3$) of the third liquid crystal cell 5 shown in FIG. 6D is continuously distributed, and thus the third liquid crystal cell 5 has a spatially continuous distribution of optical phase. Please note that because the first, second, and third liquid crystal cells 1, 3, 5 have the spatially continuous distribution of optical phase, the liquid crystal lens of the disclosure can provide a spatially continuous distribution of optical phase.

In an embodiment shown in FIG. 6A, the third electrode layer unit 6 may include a third non-patterned electrode layer 61 and a third patterned electrode layer 62 which are separated from each other along the normal line (N), and which are disposed at two opposite sides of the third liquid crystal cell 5, respectively, so as to generate the third predetermined radially varying electric field across the third liquid crystal cell 5. The third non-patterned electrode layer 61 may be disposed to cover the central portion 100, and the first, second, and third surrounding portions 101, 102, 103 of the third liquid crystal cell 5, from the bottom sides thereof.

In an embodiment shown in FIG. 6A, the third patterned electrode layer 62 includes a third distal electrode film 621 and a third proximate electrode film 622 which are disposed distal from and proximate to the third liquid crystal cell 5, respectively, and which are separated from each other by a second insulating layer 623 and a second resistance layer 624. The third insulating layer 623 and the third resistance layer 624 are respectively in contact with the third distal and proximate electrode films 621, 622. The third distal electrode film 621 may be disposed to cover the central portion 100, and the first, second, and third surrounding portions 101, 102, 103 of the third liquid crystal cell 5. The third proximate electrode film 622 has a central electrode region 625 and a surrounding electrode region 626 which are radially separated from each other so as to orient the second liquid crystal molecules 32 to permit the second surrounding portion 102 of the third liquid crystal cell 5 to have the second gradient of refractive index when the third predetermined radially varying electric field is generated across the third liquid crystal cell 5. The central electrode region 625 corresponds in position to the central portion 100 and the first surrounding portion 101 of the third liquid crystal cell 5 and may be disposed to cover the central portion 100 and the first surrounding portion 101 of the third liquid crystal cell 5. The surrounding electrode region 626 corresponds in position to the third surrounding portion 103 of the third liquid crystal cell 5, and may be disposed to cover the surrounding portion 103 of the third liquid crystal cell 5.

Furthermore, a sixth voltage ($V_6$) between the surrounding electrode region 626 and the third non-patterned electrode layer 61, a seventh voltage ($V_7$) between the central electrode region 625 and the third non-patterned electrode layer 61, and an eighth voltage ($V_8$) between the third distal electrode film 621 and the third non-patterned electrode layer 61 may be varied for varying the third gradient of refractive index and the values of the refractive indexes ($n_{3b}$ and $n_{3c}$). By varying the first to eighth voltages ($V_1$ to $V_8$), a focal length of the liquid crystal lens may be varied continuously.

In an embodiment shown in FIG. 6A, the first, second, and third liquid crystal cells 1, 3, 5 have the same thickness. The second radius ($R_2$) is equal to the first radius ($R_1$) multiplied by the square root of two (i.e., $R_2=\sqrt{2} \times R_1$). The third radius ($R_3$) is equal to the second radius ($R_2$) multiplied by the square root of 1.5 (i.e., $R_3=\sqrt{1.5} \times R_2$), and is equal to the first radius ($R_1$) multiplied by the square root of 3 (i.e., $R_3=\sqrt{3} \times R_1$).

In an embodiment shown in FIG. 6A, the third patterned electrode layer 62, together with the third insulating layer 623 and the third resistance layer 624, is sandwiched between two substrates 84, 85. The third liquid crystal cell 5 and the third non-patterned electrode layer 61 are sandwiched between the substrate 85 and a substrate 86. Each of the substrates 84-86 is a light-transmissive substrate, such as a glass substrate or the like. The substrates 76, 84 may be joined to each other by a suitable adhesive.

Figure 7:
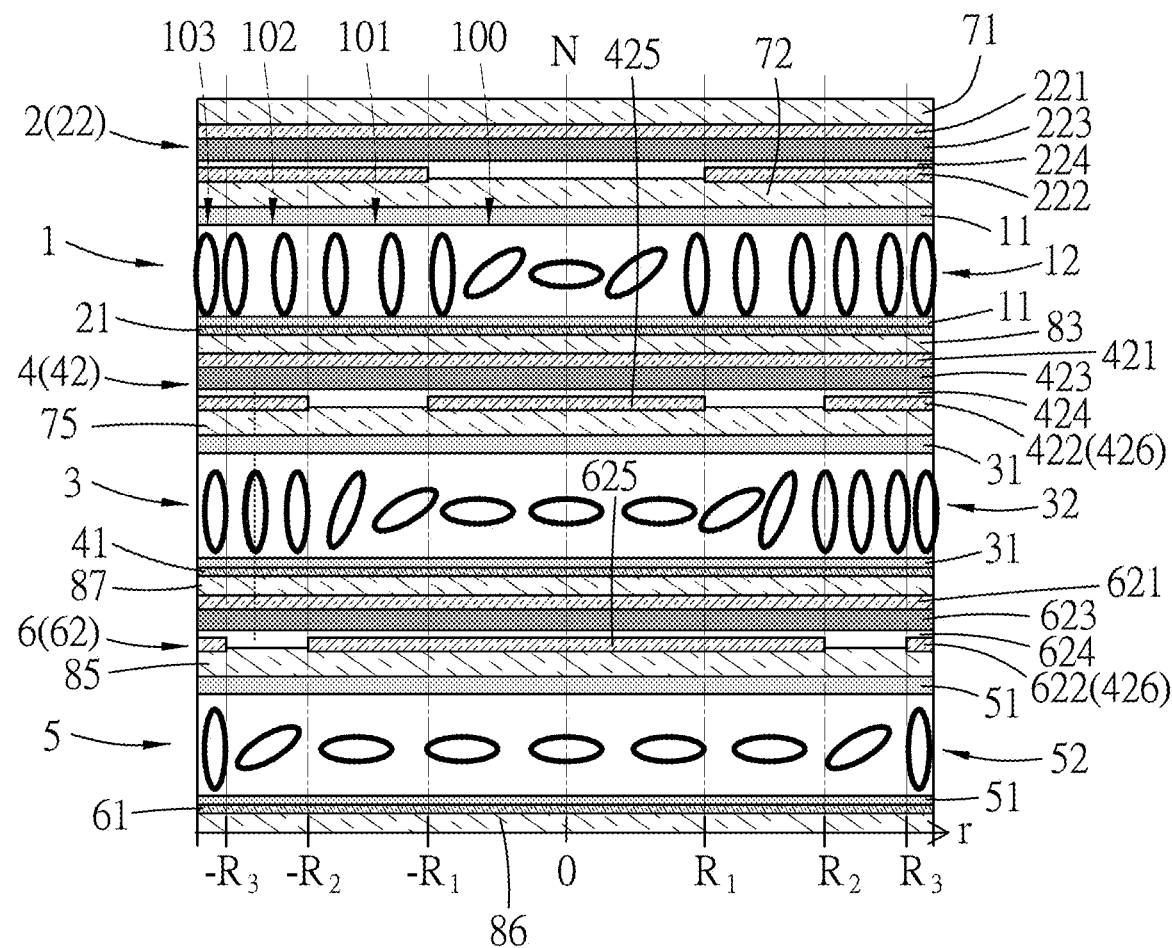
FIG. 7 is a schematic cross-sectional view of a liquid crystal lens according to a seventh embodiment of the disclosure.

FIG. 7 illustrates a liquid crystal lens according to a seventh embodiment of the disclosure. The seventh embodiment is similar to the sixth embodiment, except that in the seventh embodiment, the first and second liquid crystal cells 1, 3 share the same substrate 83, and the second and third liquid crystal cells 3, 5 share the same substrate 87. Therefore, the substrates 73, 74, 76, 84 shown in the sixth embodiment are omitted in this embodiment. Each of the substrates 83, 87 is a light-transmissive substrate, such as a glass substrate or the like.

In the liquid crystal lens of the disclosure, with the provision of a plurality of the liquid crystal cells, the aperture of the liquid crystal lens may be enlarged. In addition, because the total thickness of liquid crystal molecules is distributed to the plurality of liquid crystal cells, the response speed of the liquid crystal molecules may be faster, and the liquid crystal molecules may be effectively aligned by the respective alignment layers.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A liquid crystal lens comprising:
   a first liquid crystal cell including
      a pair of first alignment layers which are spaced apart from each other along a normal line, and
      a plurality of first liquid crystal molecules which are filled between and aligned by said first alignment layers;

a first electrode layer unit disposed to generate a first predetermined varying electric field across said first liquid crystal cell so as to permit a first segment of said first liquid crystal cell to have a first gradient of refractive index;

a second liquid crystal cell disposed beneath said first liquid crystal cell, and including
  a pair of second alignment layers which are spaced apart from each other along the normal line, and
  a plurality of second liquid crystal molecules which are filled between and aligned by said alignment layers; and a second electrode layer unit disposed to generate a second predetermined varying electric field across said second liquid crystal cell so as to permit a second segment of said second liquid crystal cell to have a second gradient of refractive index, wherein said first and second segments are staggered in a direction of the normal line;

wherein said first and second predetermined varying electric fields are each independently a predetermined radially varying electric field;

wherein each of said first and second liquid crystal cells has a central portion which the normal line passes through, a first surrounding portion which surrounds said central portion, and a second surrounding portion which surrounds said first surrounding portion, said central portion and said first and second surrounding portions of said second liquid crystal cell being respectively in alignment with those of said first liquid crystal cell in the direction of the normal line;

wherein said first electrode layer unit is configured such that when the first predetermined varying electric field is generated across said first liquid crystal cell, said central portion of said first liquid crystal cell, serving as said first segment, is permitted to have the first gradient of refractive index; and wherein said second electrode layer unit is configured such that when the second predetermined varying electric field is generated across said second liquid crystal cell, said first surrounding portion of said second liquid crystal cell, serving as said second segment, is permitted to have the second gradient of refractive index, to thereby allow said central portion of said first liquid crystal cell and said first surrounding portion of said second liquid crystal cell to cooperatively define an aperture of said liquid crystal lens.

2. The liquid crystal lens according to claim 1, wherein
said first electrode layer unit includes a first non-patterned electrode layer and a first patterned electrode layer which are separated from each other along the normal line, and which are disposed at two opposite sides of said first liquid crystal cell, respectively, so as to generate the first predetermined varying electric field across said first liquid crystal cell; and
said second electrode layer unit includes a second non-patterned electrode layer and a second patterned electrode layer which are separated from each other along the normal line, and which are disposed at two opposite sides of said second liquid crystal cell, respectively, so as to generate the second predetermined varying electric field across said second liquid crystal cell.

3. The liquid crystal lens according to claim 2, wherein said first patterned electrode layer includes a first distal electrode film and a first proximate electrode film which are disposed distal from and proximate to said first liquid crystal cell, respectively, and which are separated from each other by a first insulating layer and a first resistance layer, said first insulating layer and said first resistance layer being respectively in contact with said first distal and proximate electrode films, said first proximate electrode film having a cutout region corresponding in position to said central portion of said first liquid crystal cell so as to orient said first liquid crystal molecules to permit said central portion of said first liquid crystal cell to have the first gradient of refractive index when the first predetermined varying electric field is generated across said first liquid crystal cell.

4. The liquid crystal lens according to claim 2, wherein said second patterned electrode layer includes a second distal electrode film and a second proximate electrode film which are disposed distal from and proximate to said second liquid crystal cell, respectively, and which are separated from each other by a second insulating layer and a second resistance layer, said second insulating layer and said second resistance layer being respectively in contact with said second distal and proximate electrode films, said second proximate electrode film having a central electrode region and a surrounding electrode region which respectively correspond in position to said central portion and said second surrounding portion of said second liquid crystal cell and which are radially separated from each other so as to orient said second liquid crystal molecules to permit said first surrounding portion of said second liquid crystal cell to have the second gradient of refractive index when the second predetermined varying electric field is generated across said second liquid crystal cell.

5. The liquid crystal lens according to claim 2, wherein said first patterned electrode layer is separated from a corresponding one of said first alignment layers by a first resistance layer, and has a patterned region and a non-patterned region surrounding said patterned region, said patterned region corresponding in position to said central portion of said first liquid crystal cell so as to orient said first liquid crystal molecules to permit said central portion of said first liquid crystal cell to have the first gradient of refractive index when the first predetermined varying electric field is generated across said first liquid crystal cell.

6. The liquid crystal lens according to claim 2, wherein said second patterned electrode layer is separated from a corresponding one of said second alignment layers by a second resistance layer, and has a central electrode region and a surrounding electrode region which respectively correspond in position to said central portion and said second surrounding portion of said second liquid crystal cell and which are radially separated from each other so as to orient said second liquid crystal molecules to permit said first surrounding portion of said second liquid crystal cell to have the second gradient of refractive index when the second predetermined varying electric field is generated across said second liquid crystal cell.

7. The liquid crystal lens according to claim 1, wherein
  a thickness of said second liquid crystal cell is three times a thickness of said first liquid crystal cell; and
  said central portion of each of said first and second liquid crystal cells defines a first radius about the normal line, and said central portion and said first surrounding portion of each of said first and second liquid crystal cells cooperatively define a second radius about the normal line, the second radius being two times the first radius.

8. The liquid crystal lens according to claim 1, wherein said first and second liquid crystal cells have the same thickness; and said central portion of each of said first and second liquid crystal cells defines a first radius about the normal line, and said central portion and said first surrounding portion of each of said first and second liquid crystal cells cooperatively defines a second radius about the normal line, the second radius being equal to the first radius multiplied by the square root of two.

9. The liquid crystal lens according to claim 1, wherein each of said first and second liquid crystal cells further has a third surrounding portion which surrounds said second surrounding portion, said liquid crystal lens further comprising:

a third liquid crystal cell having a central portion, a first surrounding portion which surrounds said central portion, a second surrounding portion which surrounds said first surrounding portion, and a third surrounding portion which surrounds said second surrounding portion, said third liquid crystal cell being disposed beneath said second liquid crystal cell to permit said central portion, and said first, second, and third surrounding portions of said third liquid crystal cell to be respectively in alignment with those of said second liquid crystal cell in the direction of the normal line, said third liquid crystal cell including a pair of third alignment layers which are spaced apart from each other along the normal line, and a plurality of third liquid crystal molecules which are filled between and aligned by said third alignment layers; and a third electrode layer unit disposed to generate a third predetermined radially varying electric field across said third liquid crystal cell so as to orient said third liquid crystal molecules to permit said second surrounding portion of said third liquid crystal cell to have a third radial gradient of refractive index, to thereby allow said central portion of said first liquid crystal cell, said first surrounding portion of said second liquid crystal cell, and said second surrounding portion of said third liquid crystal cell to cooperatively define the aperture of said liquid crystal lens.

* * * * *